July 7, 1953  S. MENDELSOHN  2,644,380
ADJUSTABLE SUPPORT FOR CAMERAS AND SYNCHRONIZERS
Filed Nov. 30, 1949
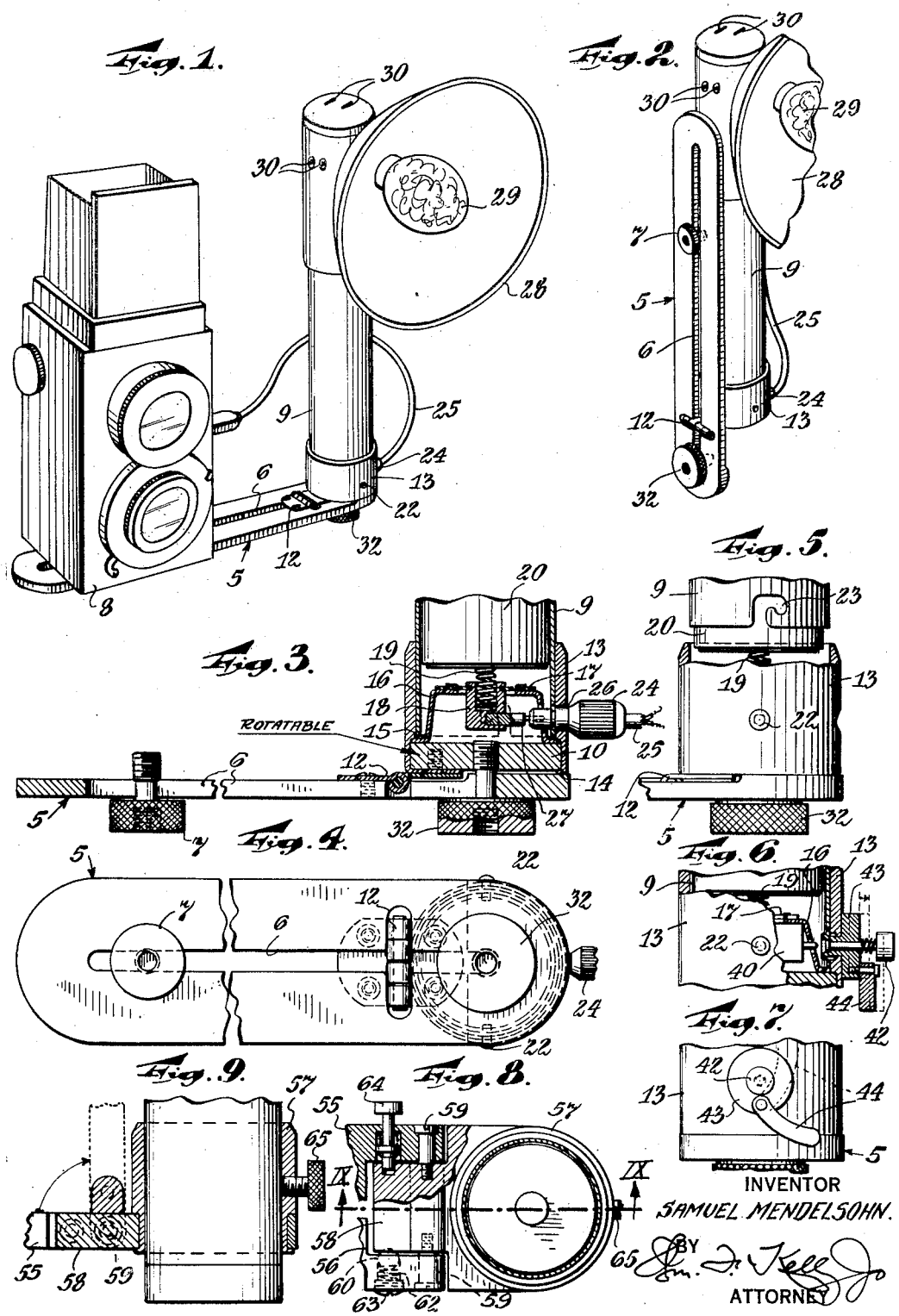
INVENTOR
SAMUEL MENDELSOHN.
BY
ATTORNEY Patented July 7, 1953

2,644,380

UNITED STATES PATENT OFFICE 2,644,380

ADJUSTABLE SUPPORT FOR CAMERAS AND SYNCHRONIZERS

Samuel Mendelsohn, Glen Ridge, N. J.

Application November 30, 1949, Serial No. 130,141

5 Claims. (Cl. 95—11.5)

The present invention relates to camera synchronizers and more particularly to a support for the synchronizer unit and camera which may be adjustably secured to a camera of substantially any make and wherein the synchronizing unit with its integral reflector is also adjustable to position the resulting light beam in desired relationship with respect to the field of vision of the camera lens.

Heretofore it has been customary in the art to fasten the synchronizer to the side of the camera usually by means of a clamp rigidly fastened to the latter and to the battery case of the synchronizer. Such construction has been subject to several disadvantages. In the first place this has resulted in more or less of a permanent assembly, since it is difficult for the photographer to detach the synchronizer at will from the camera even when the camera is utilized for the taking of photographs when the light is sufficient so that a photoflash lamp need not be employed. Also, the camera with the permanently attached synchronizer is unwieldy and thus difficult to store when not in use, as well as for packing and shipping purposes.

It is accordingly the primary object of the present invention to provide a support for a camera synchronizer which enables the ready attachment and detachment of the unit to the camera.

Another object of the present invention is the provision of a support for a camera synchronizer which can be readily attached to and detached from substantially any make of camera and wherein the support is adjustable to enable a varying of the spacing between the synchronizer and the camera.

Another object of the present invention is the provision of a support for a camera synchronizer wherein the support is pivotally connected to the battery case portion of the synchronizer to enable the latter to be moved in parallel relation to the support for packing and shipping.

A further object of the present invention is the provision of a support for camera synchronizers wherein the battery case portion of the latter is axially adjustable perpendicular to the support to position the synchronizer so that the ensuing light beam from the photoflash lamp will coincide with the desired visual field of the camera lens.

Still further objects of the present invention will become obvious to those skilled in the art by reference to the accompanying drawing wherein:

Figure 1 is a perspective view of a camera and a synchronizer therefor employing a support in accordance with the present invention, Figure 2 is a perspective view of the synchronizer support of the present invention and showing the folded position of the support relative to the battery case portion of the synchronizer.

Figure 3 is a fragmentary sectional view of the synchronizer support of the present invention in its position ready for attachment to a camera.

Figure 4 is a bottom view of the support as shown in the preceding figures.

Figure 5 is a fragmentary view showing the structure and its assembly of the battery case position of the synchronizer to the support of the present invention.

Figure 6 is a fragmentary sectional view showing a detail of a slight modification which the synchronizer support of the present invention may take, Figure 7 is a view similar in many respects to that of Figure 6 but taken at 90° to the latter, Figure 8 is a fragmentary sectional view of another modification which the synchronizer support of the present invention may take, and Figure 9 is a fragmentary sectional view taken on the line VIII—VIII of Figure 8.

Referring now to the drawings in detail the embodiment of the present invention is shown as comprising an elongated metallic member 5 provided with a longitudinal slot 6 extending the greater part of its entire length and positioned in this slot is a knurl-head screw 7 which engages the usual threaded opening in the bottom of a camera 8 for the purpose of fastening the member 5 to the camera, at any point along the elongated slot 6. Carried by the member 5 adjacent the opposite end is the synchronizer unit 9 and more particularly the battery casing portion of such unit, so as to adapt the latter to the types of synchronizers where the tripper relay is built as an integral part of a camera, or as a separate unit attachable thereto. As shown more particularly in Figure 3, the member 5 is provided with a base member formed as an annular block 10 which is fastened to the member 5 by a hinge 12 and a collar 13 surrounds the block 10 with the lower periphery 14 of this collar being rolled under the block 10, so as to space the latter slightly from the member 5. The collar 13 is also provided with an internal shoulder 15 bearing against an annular lip of an inverted cup-shaped bridge 16 disposed between the shoulder 15 and the upper peripheral edge of the block 10.

Secured to the upper surface of the bridge 16 is an insulating member 17 carrying a recessed metallic contact 18 for housing an electrical contact spring 19 in the recess and which makes connection with the dry cell batteries 20 disposed interiorly of the battery case portion of the synchronizer unit 9. In order to hold the synchronizer unit 9 in the member 5, the collar 13 is provided with diametrically disposed pins 22 (Figures 4 and 5) engageable with L-shaped slots 23 (Figure 5) provided in synchronizer unit 9, thus forming a bayonet clutch connection therebetween.

A detachable connector 24 carried by a conductor cable 25 is arranged to make electrical contact with the grounded casing of the synchronizer unit, by having its metallic sleeve portion 26 engage the sides of an opening provided in the collar 13, while a further contact 27, insulated from the sleeve portion 26, passes through the opening provided in the collar 13, as well as similar openings in the battery case of the synchronizer unit 9 and cup-shaped bridge 16, where such contact 27 telescopically engages the internally recessed contact 18. Thus electrical energy of both a positive and negative polarity is carried by the cable 25 to the tripper relay of the camera, as shown in Figure 1, and when inserted in its socket the detachable connector 24 forms a lock holding the battery case of the unit 9 securely in the collar 13 against rotation relative to each other, or removal of the synchronizer unit 9 from the collar 13. The upper end of the battery case has secured thereto the customary reflector 28 and socket for the photo-flash lamp 29 which constitute the other elements of the synchronizer unit and is also provided with additional sockets 30 for plugging in additional conductor cables when desired.

From the foregoing description of the present invention it is obvious that the member 5 is pivotally connected to the synchronizer unit by means of the hinge 12 which enables the member 5 to be moved to a position parallel to the battery casing portion of the synchronizer unit 9 for shipment or storage when not in use and as shown in Figure 2. When the member with the attached synchronizer is assembled on the camera 8, as seen from Figure 1, such pivotal movement about the hinge 12 is prevented by a knurl-headed screw 32, similar to that of the screw 7, which threadedly engages the block 10, as shown more particularly in Figure 3.

It will also be noted that the synchronizer unit is rotatably adjustable about a vertical axis perpendicular to the member 5. Such rotation is made prior to complete tightening of the set screw 32, which allows the synchronizer unit 9 together with the collar 13 to which it is secured when assembled, to rotate about the base block 10, with the rolled lower periphery 14 of the collar 13 forming one bearing surface while the shoulder 15 together with the lip of the cup-shaped bridge 16 resting on the upper surface of the block 10 forms the other bearing surface. When the operator rotates the synchronizer so as to direct the light beam projected by the reflector 28 in the visual field of the camera lens, he then tightens the set screw 32 which binds the lower bearing, formed by the rolled periphery 14 of the collar 13, into firm frictional engagement both with the block 10 and the member 5 thus preventing further rotary adjustment until the screw 32 is again slightly loosened.

The structure shown in the modification of Figures 6 and 7 differs from that previously described in that the detachable connector 24 has been dispensed with and in lieu thereof, the synchronizer unit is shown provided with a switch 40, such as a microswitch carried by the cup-shaped bridge 16 for controlling operation of the synchronizer unit. Such switch is operable by a spring pressed plunger 42 carried by a block 43 on the side of the collar 13 and which plunger passes through an opening in the wall of the casing 9 so as to be engageable with the switch 40 for operation of the latter when desired by simply depressing the plunger 42. The plunger, however, again serves as a lock for the casing 9 in the same manner as previously described relative to the detachable connector 24. Also in order to prevent accidental depression of the plunger 42 with inadvertent operation of switch 40, a pivoted arm 44 is connected to the block 43 and which is movable to position the free end of the arm 44 beneath the head of the plunger, as shown in dotted lines in Figure 7, thus serving as a lock against depression of the plunger 42 until desired, when such arm is then moved out of locking position, as shown in full lines in Figure 7.

By reference now to Figures 8 and 9, a still further modification of the present invention is shown therein. In such modification the member 55 is cut away to form a bifurcated portion 56 at one end and the collar 57 has an extending portion 58 which fits into the bifurcated portion 56 and is pivoted thereto at the pins 59, thus allowing the member 55 to be moved into a position parallel with the synchronizer unit about the pivots 59, in the same manner as shown in Figure 2 where a hinge was employed. In order to lock the member 55 in its position ready for attachment to a camera 8, one arm of the bifurcated portion 56 may be provided with a ball 60 held in engagement with an arcuate recess on the side of the collar extension 58 by a spring 62 and a closing screw 63. In addition a lock in the form of a spring pressed plunger 64 is provided which passes through the other arm of the bifurcated portion 56 and engages a recess provided on the side of the collar extension 58, as shown particularly in Figure 8. Also in this modification, the collar 57 is in no way closed by an element, such as the block 10 of the previously described embodiment, which thus allows the synchronizer unit to be telescopically adjustable relative to the support 55 and to be held in any desired telescopic and axial position by a set screw 65.

It can thus be readily appreciated from the foregoing that a support for a synchronizer unit is provided by the present invention which is readily and adjustably connected to a camera and wherein the support is pivotally connected to the synchronizer unit to enable it to be moved into a position parallel to such synchronizer unit for storing and shipping as well as allowing for axial adjustment of the synchronizer unit relative to the support as desired.

Although several modifications of the present invention have been herein shown and described, it will be understood that still further embodiments thereof may be made without departing from the spirit and scope of the appended claims.

I claim:

1. A support for a camera and synchronizer unit comprising an elongated member, securing means movable to various positions longitudinally of said elongated member and engageable with a camera for adjustably securing said camera to said elongated member, an annular member pivotally connected to the end of said elongated member remote from said camera for detachable connection to the battery case portion of a synchronizer unit to enable said elongated member to be folded substantially parallel to said synchronizer unit battery case portion for storage and shipment, and locking means carried by said elongated member and engageable with said annular member for securing said synchronizer unit battery case portion in a perpendicular position relative to said elongated member and to prevent pivotal movement therebetween preparatory to connection of said support to a camera.

2. A support for a camera and synchronizer unit comprising an elongated member provided with a longitudinal slot therein, securing means movable to various positions within the slot of said elongated member and engageable with a camera for adjustably securing said camera to said elongated member, an annular member pivotally connected to the end of said elongated member remote from said camera for detachable connection to the battery case portion of a synchronizer unit to enable said elongated member to be folded substantially parallel to said synchronizer unit battery case portion for storage and shipment, and a locking means carried by said elongated member for interconnecting the latter and said annular member to hold the battery case portion of the synchronizer unit in a perpendicular position relative to said elongated member and to prevent pivotal movement between said annular member and said elongated member preparatory to connection of said support to a camera.

3. A support for a camera and synchronizer unit comprising an elongated member, securing means movable to various positions longitudinally of said elongated member and engageable with a camera for adjustably securing said camera to said elongated member, an annular member pivotally connected to the end of said elongated member remote from said camera for detachable connection to the battery case portion of a synchronizer unit to enable said elongated member to be folded substantially parallel to said synchronizer unit battery case portion for storage and shipment, and said annular member having a portion thereof rotatable about an axis perpendicular to the pivotal connection between said elongated member and said annular member to enable axial adjustment of the synchronizer unit prior to its use, and locking means carried by said elongated member and engageable with said annular member for securing the synchronizer unit battery case portion against rotation and pivotal movement relative to said elongated member preparatory to connection of said support to a camera.

4. A support for a camera and a synchronizer unit comprising an elongated member provided with a longitudinal slot therein, securing means movable to various positions longitudinally of said elongated member and engageable with a camera for adjustably securing said camera to said elongated member, an annular member pivotally connected to the end of said elongated member remote from said camera for detachable connection to the battery case portion of a synchronizer unit to enable said elongated member to be folded substantially parallel to said synchronizer unit battery case portion for storage and shipment, and said annular member having a portion thereof rotatable about an axis perpendicular to the pivotal connection between said elongated member and said annular member to enable axial adjustment of the synchronizer unit prior to its use, and locking means carried by said support and interconnecting said elongated member and said annular member to prevent pivotal and rotary movement therebetween when desired.

5. A support for a camera and synchronizer unit comprising an elongated member, securing means movable to various positions longitudinally of said elongated member and engageable with a camera for adjustably securing said camera to said elongated member, an annular member having a base portion pivotally connected to the end of said elongated member remote from said camera and provided with an annular collar rotatable about said base member on an axis perpendicular to the pivotal connection between said base member and said elongated member, and said annular collar being detachably engageable with the synchronizer unit battery case portion to enable the same to be rotated about the axis of said annular collar and said elongated member to be moved substantially parallel to the synchronizer unit battery case portion for storage and shipment, locking means carried by said support and interconnecting said elongated member and said annular member to prevent pivotal and rotary movement therebetween when desired, and a connector for carrying electrical current passing through an opening in said annular collar and into the synchronizer unit battery case portion when connected to said collar to prevent detachment thereof.

SAMUEL MENDELSOHN.

References Cited in the file of this patent

UNITED STATES PATENTS

| Number | Name | Date |
|---|---|---|
| 1,427,532 | Hambrock | Aug. 29, 1922 |
| 2,213,749 | Strauss | Sept. 3, 1940 |
| 2,295,853 | Ley | Sept. 15, 1942 |
| 2,314,033 | Curran | Mar. 16, 1943 |

FOREIGN PATENTS

| Number | Country | Date |
|---|---|---|
| 373,360 | Great Britain | Mar. 26, 1932 |
| 246,692 | Switzerland | Jan. 31, 1947 |
| 951,091 | France | Apr. 11, 1949 |